3,296,615
IDENTIFICATION AND RECOGNITION SYSTEM

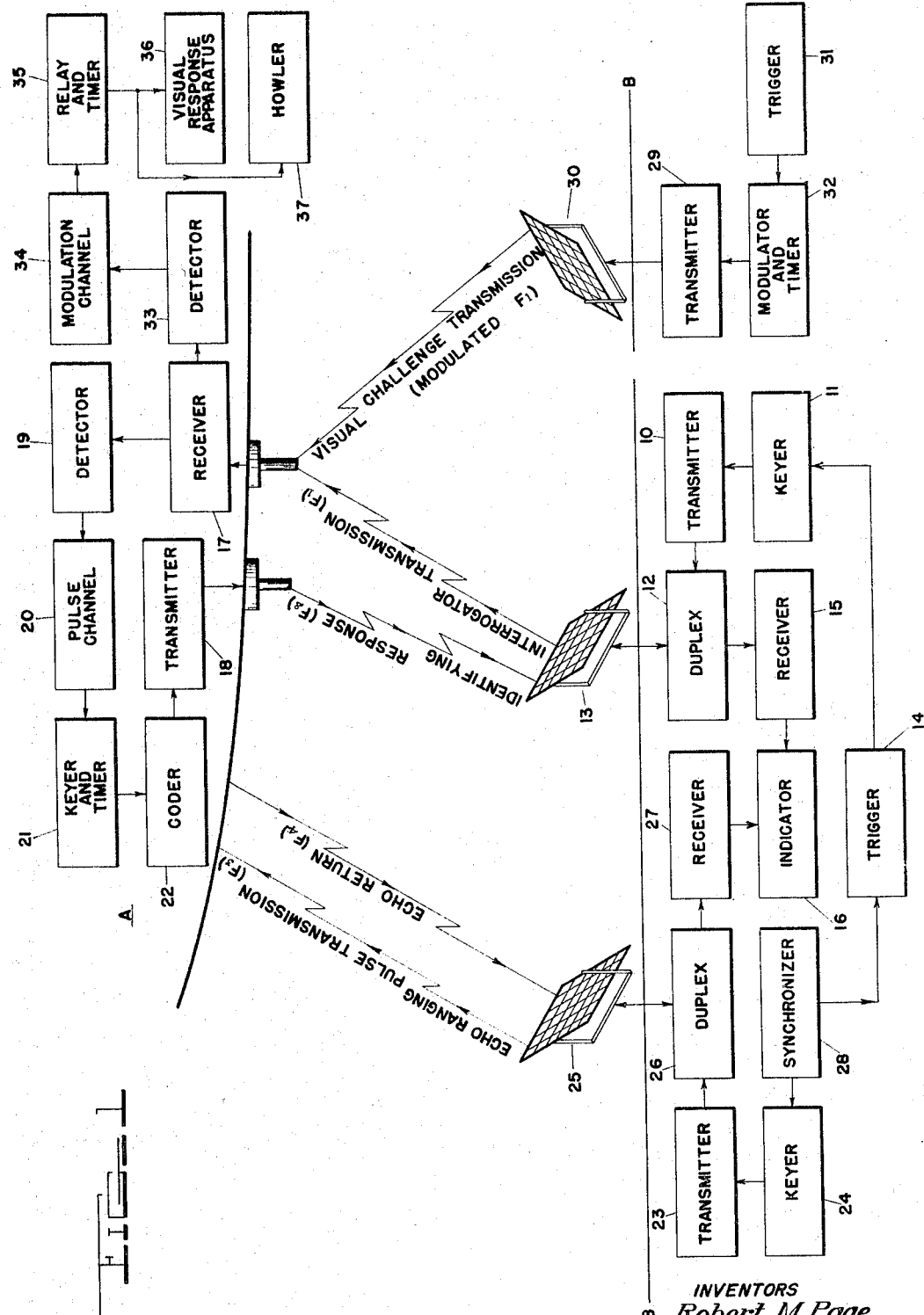

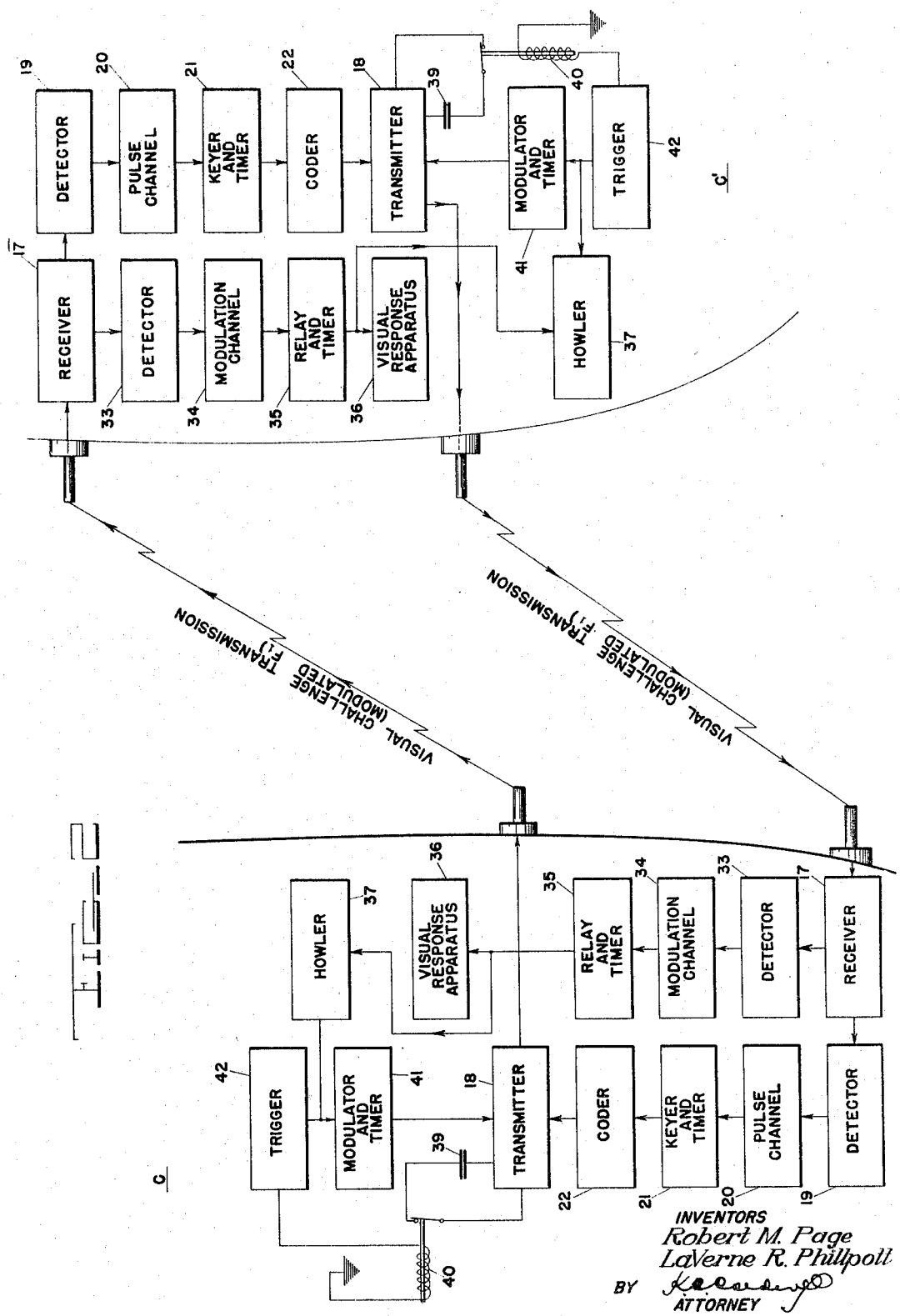

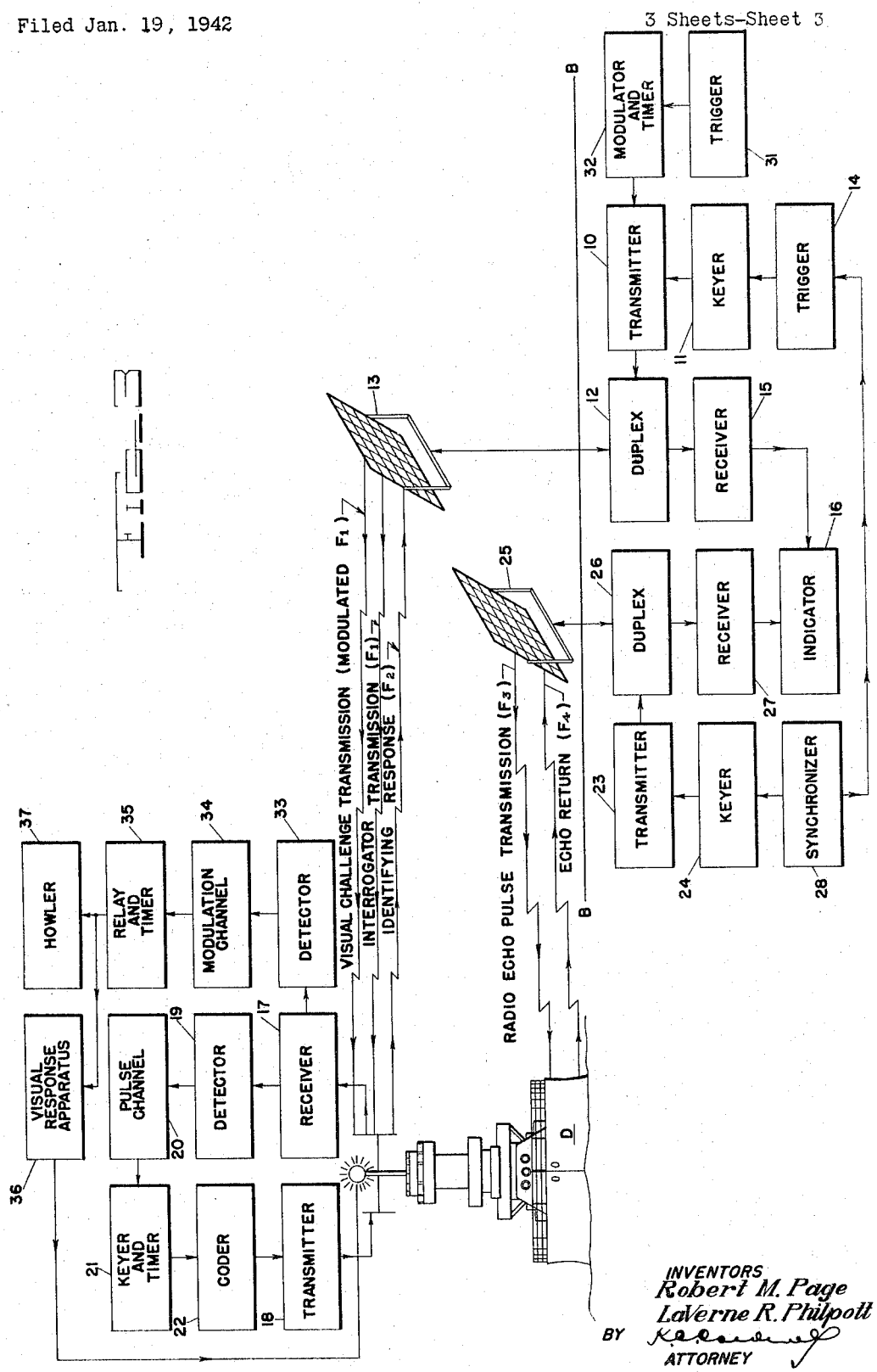

Robert M. Page and La Verne R. Philpott, Washington, D.C., assignors to the United States of America as represented by the Secretary of the Navy
Filed Jan. 19, 1942, Ser. No. 427,240
4 Claims. (Cl. 343—6.5)

The invention described herein may be manufactured and used by or for the Government of the United States of America for governmental purposes without the payment of any royalties thereon or therefor.

This invention relates to radio identification and recognition systems and more particularly to methods of and means for identifying and recognizing remote craft.

Various systems have been provided heretofore, such as radio echo ranging systems, for detecting the presence of craft remote from a reference station and for indicating the range of craft so detected with respect to the station. However, such prior systems do not provide means for identifying or recognizing the detected craft in order to determine whether the same are operated by friendly or unfriendly forces.

It is therefore an object of the present invention to provide a novel method for identifying remote craft.

Another object is to provide a novel system for identifying remote craft.

Another object is to provide a novel method for detecting the presence of remote craft, indicating the range and bearing of detected craft at a reference station, and for determining whether such craft are operated by friendly or unfriendly forces.

Another object is to provide a novel system for detecting the presence of remote craft, for indicating the position of detected craft at a reference station, and for determining whether such craft are operated by friendly or unfriendly forces.

Another object is to provide a system for determining whether remote craft are operated by friendly or unfriendly forces having an apparatus at a reference point for emitting an interrogatory transmission, and an apparatus positioned upon friendly remote craft for receiving said interrogatory transmission and automatically transmitting an identifying response which is subsequently received and indicated at the reference point.

Another object of the invention is to provide in connection with an identifying system of the above type a radio echo ranging system which functions to detect the presence of and indicate the positions of all craft remote from a reference point, whereby each craft so detected may be identified to determine whether the same is operated by friendly or unfriendly forces.

Still another object of the present invention is to provide a system for determining whether remote craft are operated by friendly or unfriendly forces which comprises an apparatus positioned at a reference point emitting an interrogatory transmission which is received by suitable apparatus positioned on friendly craft for automatically producing a visual indication of the reception of such transmission.

Still another object is to provide an apparatus positioned on friendly craft, such as aircraft, for example, that is responsive to a plurality of interrogatory transmissions emitted from a reference point, of such construction that the same may be utilized to emit an identifying transmission for determining whether aircraft, remote therefrom, are operated by friendly or unfriendly forces.

Still another object is to provide an apparatus responsive to a certain interrogatory transmission for emitting an identifying response having predetermined code characteristics.

Still another object is to provide in apparatus of the foregoing character a novel system for periodically varying the code characteristics impressed upon the identifying response in a predetermined manner throughout a predetermined period of time.

Still another object is to provide an apparatus positioned on friendly craft that is responsive to a first interrogatory transmission for automatically emitting an identifying response thereto and responsive to a second interrogatory transmission for producing a visual indication of the reception of such transmission.

Other objects and features of the present invention will appear more fully from the following detailed description when considered in connection with the accompanying drawings which disclose several embodiments of the invention. It is to be expressly understood, however, that the drawings are designed for purposes of illustration only and not as a definition of the limits of the invention, reference for the latter purpose being had to the appended claims.

In the drawings, wherein similar reference characters denote similar parts throughout the several views:

FIG. 1 is a diagrammatic showing of an identification and recognition system, constructed in accordance with the principles of the present invention, for determining whether craft remote from a reference station are operated by friendly or unfriendly forces;

FIG. 2 is a diagrammatic showing of the apparatus positioned on remote friendly craft that includes means for inter-craft recognition, and FIG. 3 is a diagrammatic view showing an identification and recognition system constructed in accordance with a further embodiment of the present invention.

With reference more particularly to FIG. 1 of the drawing, a system embodying the principles of the present invention is disclosed therein for determining whether remote craft, such as an aircraft designated generally at A, are operated by friendly or unfriendly forces. The system disclosed includes a plurality of apparatuses positioned at a reference station, indicated by line B—B, which may be situated on shipboard, on another craft, or at a permanent position on land. One of the apparatuses at station B—B operates to emit an interrogatory transmission that is received by a suitable apparatus, positioned on friendly craft, which automatically operates transmitting means, included in the latter apparatus for emitting an identifying response which is subsequently received and/or viewed at station B—B to give an indication that such craft are operated by friendly forces. Another apparatus positioned at station B—B, such as a radio echo ranging system, for detecting the presence of craft remote from the station and for indicating the range of craft so detected, is disclosed interconnected with the aforementioned recognition apparatus, so that the craft detected by the echo ranging system may be readily identified. Also, a third apparatus is provided at station B—B which functions to transmit a second interrogatory transmission, or a visual challenge transmission, which is received by suitable apparatus positioned on friendly craft to operate an apparatus on the craft to produce a visual response to the reception of such interrogatory transmission.

The apparatus for determining whether craft remote from station B—B are operated by friendly or unfriendly forces by producing an identification at the station comprises a radio pulse transmitter 10 provided with a suitable keyer mechanism 11 which functions to modulate the oscillations of the transmitter whereby the latter produces radio pulses at a predetermined rate on a carrier frequency $F_1$. The output of transmitter 10 passes through a channel of duplex 12 to a rotatable beam antenna 13, from which the radio pulses are emitted in the form of an interrogatory transmission. A suitable manually operable trigger mechanism 14 is provided for controlling operation of keyer 11 so that an interrogatory transmission may be emitted from antenna 13 at the will of the observer or operator of station B—B. The identifying signals emitted from remote friendly craft in response to the interrogatory transmission are received by antenna 13 and passed through a suitable receiver 15, by way of another channel of duplex 12. The identifying response is amplified at receiver 15 and passed to indicator 16, which includes a suitable cathode ray indicator tube. If the indicator is properly manipulated, the instants of reception of the identifying responses will indicate the range of all craft equipped with the proper apparatus, or the range of all friendly craft. The apparatus at craft A for receiving the interrogatory transmission and for automatically transmitting identifying responses in accordance therewith, comprises a receiver 17 tuned to the carrier frequency $F_1$ having a radio frequency amplifier of a sufficiently broad band pass characteristic to amplify short radio pulses effectively, and a radio pulse transmitter 18 for generating radio pulses on a carrier frequency $F_2$. In order to control operation of transmitter 18 in response to the interrogatory transmission received at receiver 17, the output of the latter is passed through a suitable detector 19 and a pulse channel 20, the purposes of which will appear more fully hereinafter. The output of pulse channel 20 passes to a keyer and timer apparatus 21 which functions to modulate the oscillation of transmitter 18 in order that the latter produces radio pulses at a predetermined rate and of a predetermined period of time. A coder 22 is provided in the connection between apparatus 21 and transmitter 18 to impress additional predetermined characteristics on the identifying response which becomes highly advantageous during certain phases of operation of the system as will become apparent hereinafter.

With a system of the foregoing character, upon manual operation of trigger 14, transmitter 10 operates to generate radio frequency pulses at a carrier frequency $F_1$ which are emitted from antenna 13. The apparatus positioned on friendly craft receives such interrogatory transmission at receiver 17, the output of which passes through a suitable pulse channel to operate keyer and timer 21 which controls operation of the transmitter 18 to emit an identifying response. The keyer and timer 21 function to control the rate of pulses emitted by transmitter 18; the duration of such pulses, and the rate of emission is to be predetermined and known to the observer at station B—B. The coder 22 functions to impose predetermined complex characteristics on the pulses emitted in order to minimize the possibility of unfriendly forces discovering the predetermined characteristics of the identifying responses and equipping their craft with suitable apparatus for producing a similar response. In some instances it may be desirable to control coder 22 so that predetermined complex code characteristics are periodically impressed upon the identifying response, in a predetermined manner, in order to further minimize the possibility of unfriendly forces discovering the particular characteristics of the response. The identifying response received at antenna 13 is passed through receiver 15 to indicator 16 where the predetermined characteristics impressed thereon may be readily observed and the position of all friendly craft may be determined.

In accordance with the principles of the present invention, means are provided for detecting the presence and position of craft remote from a reference station and for determining whether such detected craft are operated by friendly or unfriendly forces. Such means includes the previously described identifying apparatus positioned at station B—B, utilized in connection with a radio echo ranging system. The echo ranging system may be of conventional construction which includes a radio pulse transmitter 23, the operation of which is controlled by a keyer 24 whereby radio pulses at a predetermined rate on a carrier frequency $F_3$ are generated and emitted from a rotatable beam antenna 25 by way of a channel of duplex 26. The echo ranging pulse transmission impinges upon all craft, within the field of the apparatus, from which the same are reflected in the form of an echo return. The echo return impinges upon antenna 25 and is passed through a suitable receiver 27, by way of another channel of duplex 26, to an indicator, such as cathode ray tube type, whereon the range of all remote craft is indicated. In the present embodiment, the output of receiver 27 is passed into indicator 16 so that the range of all detected craft and the identifying responses from friendly craft may be observed at a single indicator. In order to operate these apparatuses simultaneously to give an indication of an identifying response which corresponds to a certain detected craft, means are provided for synchronizing operation of the echo ranging system and the pulse identifying apparatus. As shown in the drawing, such means comprises a synchronizer 28 which supplies a synchronizing source to keyer 24, of the echo ranging system, as well as to keyer 11, trigger 14 controlling the latter connection. The foregoing systems are to be so interconnected and regulated that radio pulses are emitted from antennas 13 and 25 at the same rate, and in such a phase that the echo return and the identifying response will be received at station B—B, and indicated thereon, at substantially the same indicated range. To facilitate such operation, suitable means, not shown, may be provided to rotate antennas 13 and 25 in unison. With such an arrangement, the observer at station B—B can easily determine the range of craft remote from the station and whether or not such craft are operated by friendly or unfriendly forces.

As heretofore stated, an apparatus is also provided by the present invention for emitting a second interrogatory transmission, which is received by an apparatus positioned on friendly craft for automatically producing a visual response of the reception of such transmission. Such a system is highly advantageous when a large number of craft are present within a limited vicinity of the reference station so that the station observer may quickly determine whether the craft are operated by friendly or unfriendly forces without referring to the indicator utilized by the previously described identification system. As shown, a radio transmitter 29 is provided at station B—B which emits a radio carrier from antenna 30 upon manual operation of trigger device 31. The transmitter 29 is tuned to a carrier frequency $F_1$ and is modulated with proper modulation frequency for a predetermined period of time by means of a modulator and timer mechanism 32 for a purpose that will become apparent from the following description. Either amplitude or frequency modulation may be employed for this purpose. As will appear more fully hereinafter, transmitter 29 may be eliminated, if desired, and the output of modulator and timer mechanism 32 may be fed directly to transmitter 10. The visual challenge transmission emitted from antenna 30 is received at the remote craft A by receiver 17. In order to utilize receiver 17 for receiving the interrogatory transmission emitted from antenna 13 as well as for receiving the visual challenge transmission for respectively operating transmitter 18 to produce an identifying response and for operating a mechanism for producing the visual response, a pair of detectors 19 and 33 are provided at the output of receiver 17. Detector 19 is responsive to radio pulses emitted from transmitter 10, and feeds into the pulse channel 20, which takes the form of a pulse modulation amplifier such as a video amplifier, the output of which ultimately actuates keyer and timer mechanism 21 to control operation of transmitter 18 in a manner fully described heretofore. Detector 33 is responsive to the modulated signal generated at transmitter 29, and feeds into tuned channel 34 which includes a tuned amplifier tuned to the modulation frequency, which corresponds to the frequency of modulator and timer mechanism 32. The output of the modulation channel 34 passes to a relay and timer 35 which functions to control operation of a visual response apparatus 36, for a predetermined period of time. A howler 37 is provided which operates simultaneously with the visual response apparatus 36 to give an indication to the operator of the craft that the same has been challenged. With such an arrangement, a comparatively simple and compact apparatus is provided on friendly craft which is sensitive to a plurality of interrogatory transmissions to automatically produce varied responses thereto.

A further embodiment of the present invention is shown in FIG. 2. This embodiment discloses an intercraft recognition system for determining whether remote craft, such as aircraft, for example, are operated by friendly or unfriendly forces, by emitting an interrogatory transmission from one of the craft which is received by an apparatus positioned on the other craft to produce a visual indication of the reception of such transmission. More particularly, craft C and C' are shown each provided with like equipment, similar to the apparatus provided on craft A of FIG. 1, which are designed to operate in response to certain interrogatory transmissions from a reference station to produce a visual response, and also to emit an interrogatory transmission to other craft. In order to utilize such apparatuses for intercraft recognition, means are provided for changing the carrier-frequency of transmitters 18 from the normal setting of $F_2$ to carrier frequency $F_1$, and for modulating the carrier frequency $F_1$ with a suitable frequency so that a visual challenge transmission is emitted from the craft, which is subsequently received at other craft and passed through the proper channel to operate the visual response apparatus. As shown, suitable capacitance 39 is included in the oscillator circuit of transmitter 18 upon energization of solenoid 40 in order to tune the transmitter to a carrier frequency $F_1$. A modulator and timer apparatus 41 is provided for modulating the output of transmitter 18 with the proper modulation frequency which corresponds to the predetermined tuning of modulation channel 34, and for controlling operation of the transmitter in this manner for a predetermined period of time. A suitable trigger 42 is provided for initiating operation of modulator and timer apparatus 41 as well as simultaneously energizing solenoid 40 to change the operating frequency of transmitter 18 from $F_2$ to $F_1$.

In the operation of this embodiment, upon manual operation of trigger 42 the operating frequency of transmitter 18 is changed from the normal tuning thereof to a carrier frequency $F_1$ and modulator and timer mechanism 41 functions to modulate the output of the transmitter with a suitable modulation frequency so that a visual challenge transmission is emitted from the craft. Such transmission is received at the other craft and passed through modulation channel 34 to operate relay and timer 35; the latter device then functions to control operation of visual response apparatus 36 in a manner fully described heretofore. Transmitter 18 functions in the above manner for a predetermined period of time determined by modulator and timer apparatus 41, during such period howler 37 functions to inform the operator of the craft that transmitter 18 is operating to emit a visual challenge transmission and is thus incapable of producing an identifying response in accordance with any interrogatory transmission which might at the instant be emitted from a reference station, such as station B—B of FIG. 1. Also, visual response apparatus 36 operates for a predetermined period of time, controlled by relay and timer 35, during such time howler 37 functions to inform the pilot of the craft that the craft has been challenged by a visual challenge transmission. With the foregoing construction, intercraft recognition may be readily and effectively obtained by utilizing apparatus which functions in response to certain interrogatory transmissions from a reference station. The arrangement is such that the apparatus is utilized for a short period of time, during intercraft recognition, so that the apparatus will be available a greater portion of time to respond to interrogatory transmissions emitted from a reference station.

In FIG. 3 of the drawings an identification and recognition system is disclosed for determining, at station B—B, whether remote craft such as ship D, are operated by friendly or unfriendly forces. Although station B—B as shown, includes equipment for emitting interrogatory transmissions and craft D is only provided with apparatus for responding to such transmissions, it is to be expressly understood that station B—B, as well as craft D, may each include apparatus for emitting interrogatory transmissions as well as apparatus for responding to interrogatory transmissions emitted from a remote station or craft. As shown, station B—B includes an apparatus for emitting an interrogatory transmission at a carrier frequency $F_1$ which is similar to the apparatus disclosed in FIG. 1. A radio echo ranging system is also provided at the station and functions to emit a radio pulse transmission from antenna 25 upon operation of keyer 24. As shown in the previous embodiment, synchronizer 28 is provided for controlling operation of the foregoing apparatuses so that transmitters 10 and 23 emit radio pulses simultaneously. In order to produce a visual transmission at station B—B, modulator and timer 32, operation of which is controlled by trigger 31, feeds directly to transmitter 10. With this arrangement the output of transmitter 10 is modulated with a suitable frequency, for a predetermined period of time, and the visual challenge transmission is emitted from antenna 13. Craft D is provided with apparatus similar to the apparatus provided on craft A.

In the operation of this embodiment, as keyer 24 operates, transmitter 23 of the echo ranging system operates to generate radio pulses on carrier frequency $F_3$ which pass through duplex 26 and are emitted from antenna 25. Such echo ranging pulse transmission impinges upon and is reflected from remote craft, such as ship D, for example, in the form of an echo return. The echo return is passed through receiver 27 to indicator 16 whereon the range of all craft within the field of the system is indicated. When it is desired to determine whether or not remote craft, the position of which are indicated at 16, are operated by friendly or unfriendly forces, trigger 14 is actuated to allow synchronizing source from synchronizer 28 to actuate keyer 11. Transmitter 10 then functions to generate radio pulses simultaneously with those of transmitter 23. The output of transmitter 10 is emitted from antenna 13 in the form of an interrogatory transmission and directed toward remote craft, the range of which having been previously determined by the radio echo ranging system.

When the interrogatory transmission is directed toward a craft operated by friendly forces, such as craft D, the transmission is received at 17, passed through detector 19 and pulse channel 20 to actuate keyer and timer mechanism 21, to control operation of transmitter 18 that emits radio pulses which comprise an identifying response. The identifying response is passed through receiver 15 at station B—B, by way of antenna 13 and duplex 12, to indicator 16. Keyer and timer mechanism 21 functions to determine the rate of pulses and the time period of such pulses which comprise the identifying response, and coder 22 operates to impress predetermined characteristics on such pulses. Since the radio pulses that comprise the echo ranging pulse transmission and the interrogatory transmission are emitted simultaneously from antennas 25 and 13, respectively, the radio pulses which comprise the echo return and the identifying response will likewise be received at station B—B and indicated at indicator 16 at substantially the same instant. The observer at station B—B may then readily determine the range of all friendly craft remote therefrom.

When a visual indication is desired to determine whether craft remote from station B—B are operated by friendly or unfriendly forces, trigger 31 is actuated to initiate operation of modulator and timer 32. The modulator and timer functions to modulate the output of transmitter 10 with a suitable modulation frequency for a predetermined period of time, and such modulator output is emitted from antenna 13 in the form of a visual challenge transmission. When such visual challenge transmission is directed within the range of friendly craft the same is received at 17, passed through modulation channel 34, by way of detector 33, to actuate relay and timer mechanism 35, which initiates operation of visual response apparatus 36, as well as actuating howler 37, to indicate to the operator of the craft that the craft has been challenged. The visual response apparatus 36 may function to produce any indication at the craft that is readily visible to the operator at station B—B, such as energization of an electric lamp, for example.

In this disclosure the term "identification" refers exclusively to that function of the apparatus which enables a remote point to make its identity known to an interrogating station by means of radio, and will usually be the type utilized beyond the limit of visibility, and the term "recognition" refers specifically to that function of the apparatus which responds with some sort of visual response applicable only within the limit of visibility. "Visual response" refers to the function of closing and/or opening a number of contacts for the purpose of initiating a response, whether that response be a visible reply, aural signal or any other type of single shot or momentary phenomenon.

The present invention thus provides novel methods and systems for determining whether remote craft are operated by friendly or unfriendly forces. The systems are of such construction that the same may be utilized in synchronism with conventional radio pulse echo ranging systems whereby remote craft may be readily detected and identified with the highest degree of accuracy and reliability. Moreover, the various identification systems disclosed provide means for identification of remote craft at a reference station in response to a suitable interrogatory transmission, as well as producing visual responses at remote friendly craft when such craft are challenged by suitable transmissions from the station, and wherein the apparatus positioned on certain remote friendly craft, such as aircraft, may be readily utilized for intercraft recognition purposes.

Although several embodiments of the present invention have been shown and described in detail heretofore, it is to be expressly understood that various changes and substitutions may be made therein without departing from the spirit of the invention as well understood by those skilled in the art. Reference therefore will be had to the appended claims as a definition of the limits of the invention.

What is claimed is:

1. A system for determining whether remote craft are operated by friendly or unfriendly forces comprising:

a first radio transmitter located at a reference station;
   keyer means for controlling the rate of pulse transmission by said first radio transmitter;
   a first receiver positioned on friendly craft for receiving the pulses transmitted by said first radio transmitter;
   a second radio transmitter positioned on friendly craft;
   a keyer positioned on friendly craft for controlling the rate of transmission of pulses by said second radio transmitter in response to the output of said first receiver;
   coder means positioned on friendly craft for impressing a predetermined code on the pulses emitted from said second radio transmitter and
   means located at said reference station and including a second receiver for deriving from the reception of the pulses emitted from said second transmitter an indication of the range of said craft from said station, said indication further displaying said code.

2. In an apparatus responsive to an interrogatory pulsed and otherwise modulated transmission for identifying a craft;

a receiver positioned on said craft and tuned to the frequency of said transmission;
   first means coupled with said receiver and responsive to pulses impressed on said transmission for producing and transmitting a radio pulse signal and
   second means coupled with said receiver and responsive to said other modulation impressed on said transmission for producing a visual identifying response to the interrogatory transmission.

3. Apparatus as set forth in claim 2 and further including a third means which controls the duration time of said visual response.

4. Apparatus as set forth in claim 2 and further including coder means which impress a predetermined code characteristic upon said radio pulse signal.

References Cited by the Examiner

UNITED STATES PATENTS

| | | | |
|---|---|---|---|
| 1,801,466 | 4/1931 | Townsend | 250—2.3 |
| 1,815,045 | 7/1931 | Boddie et al. | 250—2.22 |
| 1,945,952 | 2/1934 | Nicolson | 250—1.25 |
| 1,993,497 | 3/1935 | Wells | 250—2.5 |
| 2,134,716 | 11/1938 | Gunn | 250—2.3 |
| 2,157,122 | 5/1939 | Dunmore | 250—2.5 |
| 2,165,690 | 7/1939 | Wademan | 250—1.25 |
| 2,168,602 | 8/1939 | Hassan | 250—2.5 |
| 2,207,267 | 7/1940 | Plaistowe | 250—2.2 |
| 2,225,524 | 12/1940 | Percival. | |
| 2,252,083 | 8/1941 | Luck | 250—11 |

CHESTER L. JUSTUS, *Primary Examiner.*

CYRUS D. BACKUS, ARTHUR W. CROCKER, MELVIN H. FRIEDMAN, CLAIR M. WHITMAN, WARREN H. WILLNER, *Examiners.*

P. M. HINDERSTEIN, D. C. KAUFMAN, A. GAUSS, S. YAFFEE, *Assistant Examiners.*